Patented Oct. 29, 1940

2,219,330

UNITED STATES PATENT OFFICE 2,219,330

PHTHALOCYANINE SULPHONIC ACID CHLORIDE

Friedrich Nadler, Cologne-Mulheim, and Hans Hoyer and Otto Bayer, Leverkusen-I. G. Werk, Germany, assignors to General Aniline & Film Corporation, a corporation of Delaware No Drawing. Application May 24, 1938, Serial No. 209,720. In Germany June 8, 1937

3 Claims. (Cl. 260—314)

The present invention relates to phthalocyanine sulphonic acid chlorides and to a process of preparing the same.

It has been found that phthalocyanine sulphonic acid chlorides can be obtained in a good yield by causing chlorosulphonic acid to react at an elevated temperature upon phthalocyanines or phthalocyanine sulphonic acids. The reaction can be performed in the presence of auxiliary agents such as sodium chlorosulphonate or phosphorus pentachloride; this applies in the first line to those cases wherein non-sulphonated phthalocyanines are employed as starting materials. Phthalocyanine sulphonic acid chlorides represent valuable starting materials for the preparation of dyestuffs of the phthalocyanine series as the chlorine atoms are capable of being easily exchanged by other groupings, for instance by reaction with alcohols or phenols.

The following details are given with respect to the reaction temperature: in case of copper phthalocyanine the temperature is kept above about 125° C., preferably at about 130–135° C. In case phthalocyanine sulphonic acids are employed as starting materials the sulphonic acid groups are converted into sulphonic acid chloride groups at a temperature between 100 to about 125°, whereas a raise of temperature over 125° is necessary for introducing additional chlorosulphonic acid groups. Similar reaction temperatures are employed in case of other metal containing phthalocyanines or the sulphonic acids thereof. As metal-free phthalocyanines are somewhat more sensitive towards concentrated sulphonic acid than metal containing phthalocyanines such as the copper dyestuffs it is preferred to work at a slightly lower temperature, say at the most 125–130°.

Depending on the nature of the starting materials and the conditions of working the new products may contain more or less sulphonic acid chloride groups which may be partly saponified in the course of the working up operations into sulphonic acid groups. Generally spoken, a simple phthalocyanine of the benzene series takes up at the most four chlorosulphonic acid (or sulphonic acid) groups. In case of such phthalocyanines as contain attached to the benzene nuclei further phenyl groups (confer Examples 5 and 6) the final products may probably contain more than four sulphonic acid chloride (or sulphonic acid) groups.

The reaction mixture can be worked up either by stirring the same into ice water care being taken that the temperature does not exceed about 10°, and isolating the precipitated products, or by evaporating the excess chlorosulphonic acid in vacuo, preferably with the addition of some phosphorus pentachloride. In the latter case the residue can be employed directly for further reactions.

The following examples illustrate the present invention without, however, restricting it thereto the parts being by weight:

Example 1

10 parts of copper phthalocyanine are slowly stirred into 120 parts of chlorosulphonic acid. The suspension is heated to 145° and kept while stirring for about 1–2 hours at 135–150°. The brown coloration of the solution slowly turns greenish. The mixture is allowed to cool and then stirred into ice. The bluish-green precipitate is filtered off, washed neutral and dried. It is obtained in a yield of about 15.5 parts and probably represents a copper phthalocyanine tetrasulphonic acid chloride. The reaction product represents a bluish powder which is scarcely soluble in most organic solvents.

Example 2

2 parts of a metal-free phthalocyanine are added into 40 parts of chlorosulphonic acid and heated for about 20–40 minutes to 125–130°. The reaction mixture is worked up as described in Example 1. The resulting metal-free phthalocyanine sulphonic acid chloride represents a greenish-blue powder which is insoluble in water and cold sodium carbonate solution. In organic solvents such as nitrobenzene, trichlorobenzene and dioxane it is somewhat soluble in the heat with a greenish coloration; it is insoluble in gasoline.

Example 3

10 parts of copper phthalocyanine sulphonic acid (containing 61.7% of disulphonic acid and 34.7% of trisulphonic acid) are dissolved in 120 parts of chlorosulphonic acid and the whole is heated for 1–2 hours to 145–150°. The reaction mixture is worked up as described in Example 1. The sulphonic acid chloride thus obtained shows a behaviour similar to that of the product of Example 1.

Example 4

10 parts of the starting materials described in Example 3 are heated with 150 parts of chlorosulphonic acid for four hours to about 100–105° and worked up in the manner described above. The product thus obtained represents a mixture of the chlorides of the starting materials without additional chlorosulphonic acid groups having been introduced. It is insoluble in water. By heating the same with a dilute caustic soda lye the starting materials can be reobtained in form of their sodium salts.

*Example 5*

15 parts of tetraphenyl copper phthalocyanine prepared as described in application Serial No. 106,829 (to Bienert and Gassner) are heated with 250 parts of chlorosulphonic acid for 2-3 hours to 140-155°. After cooling the reaction mixture is worked up as described in Example 1. It represents a green powder.

*Example 6*

10 parts of diphenyl copper phthalocyanine prepared as described in application Serial No. 106,829 (to Bienert and Gassner) are stirred into 200 parts of chlorosulphonic acid and heated for 1 hour to 140-145°. Then the reaction mixture is worked up in the usual manner. It represents a bluish-green powder.

*Example 7*

10 parts of copper phthalocyanine are added into 180 parts of chlorosulphonic acid and heated for 70 minutes to 130-135° while stirring. After cooling down the reaction mixture to 60° there are added 20 parts of phosphorus pentachloride. Thereupon about 150 parts of chlorosulphonic acid are evaporated at 70-80° and 12-20 mm. pressure. The residue represents a viscous sirupy mass which can be employed directly for further reactions. By stirring the same into ice-water the reaction product is precipitated in a purer state. It can be isolated in the usual manner.

*Example 8*

10 parts of cobalt phthalocyanine are heated with 100 parts of chlorosulphonic acid to 130-145° for 1-2 hours. After cooling down to about 20° the solution is stirred into 1000 parts of ice-water, the precipitating reaction product being worked up in the usual manner. It is insoluble in water and dilute sodium carbonate solution. By boiling it in an alkaline medium there is obtained the corresponding sulphonic acid.

*Example 9*

10 parts of a copper phthalocyanine tetrasulphonic acid (obtainable by heating phthalic acid anhydride-4-sulphonic acid with copper chloride in the presence of urea) are heated with 150 parts of chlorosulphonic acid for 70 minutes to 130-140°. The reaction mixture is worked up in the usual manner by means of ice-water. The resulting reaction product represents a blue powder which is insoluble in water and cold sodium carbonate solution. By saponification the starting material is obtained in unchanged form.

We claim:

1. The process of preparing a phthalocyanine sulphonic acid chloride which comprises treating a phthalocyanine above 100° C. with chlorosulphonic acid for a period of time sufficient to produce the chloride.

2. The process of preparing a phthalocyanine sulphonic acid chloride which comprises treating copper phthalocyanine above 125° C. with chlorosulphonic acid for a period of time sufficient to produce the chloride.

3. The process of preparing a phthalocyanine sulphonic acid chloride which comprises treating a metal-free phthalocyanine at from 125 to 130° C. with chlorosulphonic acid for a period of time sufficient to produce the chloride.

FRIEDRICH NADLER.
HANS HOYER.
OTTO BAYER.